CALLAHAN & De RUSH.
Cotton Seed Huller.

No. 98,921.

Patented Jan. 18, 1870.

United States Patent Office.

W. P. CALLAHAN AND D. R. DE RUSH, OF DAYTON, OHIO.

Letters Patent No. 98,921, dated January 18, 1870.

IMPROVEMENT IN COTTON-SEED HULLERS.

The Schedule referred to in these Letters Patent and making part of the same.

To all whom it may concern:

Be it known that we, W. P. CALLAHAN and D. R. DE RUSH, of Dayton, Montgomery county, and State of Ohio, have invented a new and improved Cotton-Seed Huller; and we do hereby declare that the following is a full, clear, and exact description thereof, which will enable others skilled in the art to make and use the same, reference being had to the accompanying drawings, forming part of this specification.

This invention relates to improvements in machinery for hulling cotton-seed, and has for its object to provide a simple, cheap, and durable construction and arrangement for such machines.

The invention consists in the mode of securing the blades by means of wedge-shaped grooves and keys, the widest ends of the grooves and keys being at the eyes, whereby the grinding-action has a tendency to tighten them, all as hereinafter more fully specified.

Figure 1:
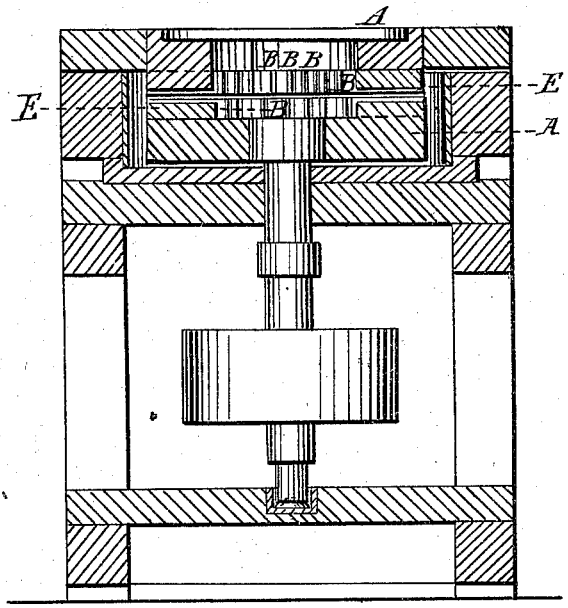
Figure 1 represents a sectional elevation of our improved machine.
Figure 2:
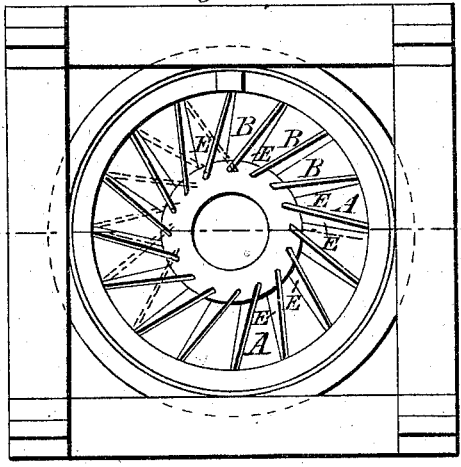
Figure 2 represent a horizontal section of the same.

A A represent the disks, preferably made of cast-iron, and provided with wedge-shaped grooves in their faces for securing the steel grinding-plates B, by means of the wedges E, the said grooves being widest at the eye, so that the grinding-action has a tendency to keep the said wedges tight.

These plates, projecting above the surfaces of the disks, are inclined from the eye in the stationary stone, the way the runner turns, and in the manner they are inclined in the opposite direction, whereby a shear, or outward action is imparted to the seeds passing between the stones, giving them a free and active movement toward the skirt. The said plates may be inclined more or less, as may be found best.

Either of the disks may be arranged for running, as preferred.

This arrangement of the blades affords a ready means of removing and replacing them, and they are very efficient in hulling cotton-seed. They are also economical in respect of repairs, as the disks remain in good condition, and the blades only have to be changed.

Having thus described our invention,

What we claim as new, and desire to secure by Letters Patent, is—

The arrangement of the wedging-grooves and wedges, in respect to the direction of the grinding-action, substantially as specified.

W. P. CALLAHAN
D. R. DE RUSH.

Witnesses:
JACOB C. STALEY,
THOS. D. MITCHELL.